Dec. 26, 1939.  E. H. LAND  2,185,000
ILLUMINATION SYSTEM FOR AUTOMOTIVE VEHICLES EMPLOYING POLARIZED LIGHT
Filed July 16, 1938
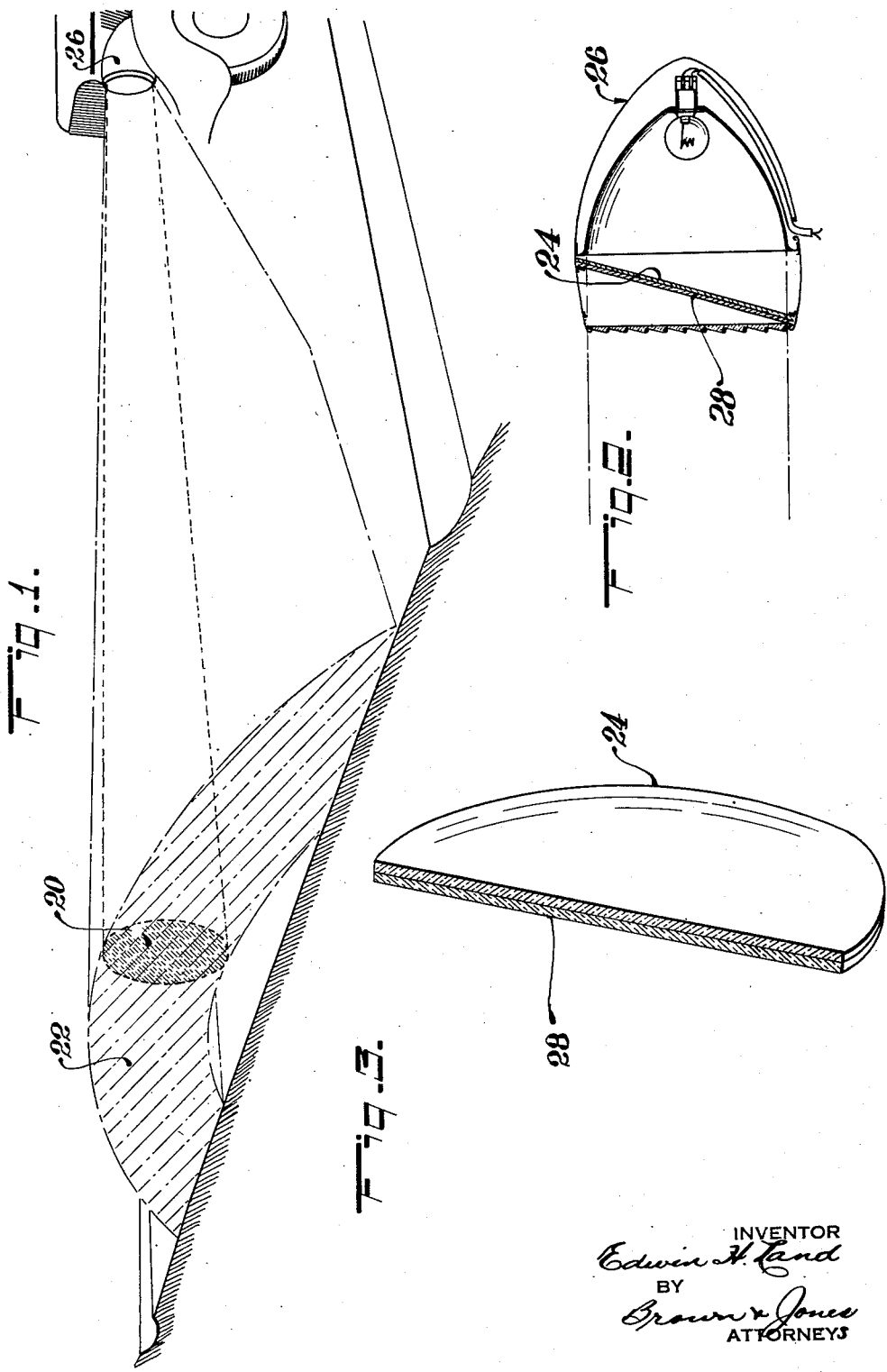
INVENTOR
Edwin H. Land
BY
Brown & Jones
ATTORNEYS Patented Dec. 26, 1939

2,185,000

UNITED STATES PATENT OFFICE 2,185,000

ILLUMINATION SYSTEM FOR AUTOMOTIVE VEHICLES EMPLOYING POLARIZED LIGHT

Edwin H. Land, Boston, Mass., assignor, by mesne assignments, to Polaroid Corporation, Dover, Del., a corporation of Delaware Application July 16, 1938, Serial No. 219,542

4 Claims. (Cl. 88—65)

This invention relates to a new and improved illumination system for automotive vehicles and the like, and more specifically to a system employing polarized light for illuminating the pathway of automotive vehicles and the like.

An object of the invention is to provide means associated with the headlights of an automotive vehicle and adapted in conjunction therewith to project a beam of light comprising a substantially undiffused component polarized in a predetermined manner and a diffused component differently polarized.

A further object of the invention is to provide such means wherein the diffused component may be spread in a predetermined manner, for example substantially horizontally.

A still further object of the invention is to provide such means wherein the direction of spread of the diffused component may be so controlled that the said component may be employed to illuminate the sides of the road adjacent the vehicle, while the non-diffused component is projected from the headlight in a manner adapted to form a hot spot in the beam emitted from the headlight.

A still further object of the invention is to provide, in connection with means of the character described, means, for example a half-wave plate, to rotate the planes of polarization of the diffused and non-diffused components of the beam so that they are vibrating substantially at 45° to the horizontal, yet without altering the direction of propagation of either beam.

This application is a continuation in part of my copending application Serial No. 83,039, filed June 2, 1936, for systems employing polarized light for the elimination of headlight glare.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

For a fuller understanding of the nature and objects of the invention, reference should be had to the following detailed description taken in connection with the accompanying drawing, in which:

Fig. 1 is a diagrammatic representation of the beam projected from a headlight equipped with one form of the invention;

Fig. 2 is a view in section of a headlight equipped with one form of the invention; and Fig. 3 is a perspective view in section of certain of the elements shown in smaller scale in Fig. 2.

In my said copending application Serial No. 83,039, there is described a headlight means for use in connection with automobile headlights and the like for the projection of two polarized components from each headlight, one component being projected as a specular non-diffused beam to form the hot spot or that portion of the beam illuminating the roadway at a distance from the vehicle, the other component being projected as a diffused or spread beam to illuminate the sides of the roadway. Each component is predeterminedly polarized, the two components being differently polarized. If, for example, the specular component is plane-polarized to vibrate in one direction, the diffused component will be plane-polarized to vibrate at 90° to the direction of vibration of the specular component.

If means are provided to circularly polarize the components and the specular component is clockwise circularly polarized, for example, the non-specular or diffused component will be counter-clockwise circularly polarized.

It thus becomes possible for the driver of an approaching vehicle to block from his view the specular or glaring component by employing a viewing screen or visor of a character adapted to block polarized light of the type forming the specular component. In this manner headlight glare is substantially reduced, as the only component remaining visible to an approaching driver is the soft, non-glaring diffused component of the emitted beam.

It is pointed out in my said copending application that the structure there described and claimed might be employed in lieu of the standard headlight lens, as it provides a beam comprising a hot spot and a diffused component to illuminate the sides of the road. It is also pointed out the the spread of the hot spot component of a standard automobile headlight is somewhat greater than that obtained by the means disclosed in my said copending application, and that therefore it might be desirable to employ, in connection with the polarizing means there described, lens means for effecting any desired control of the components of the emitted beam.

The means disclosed in my said copending application for accomplishing the desired result comprises a sheet of light-transmitting plastic material having dispersed and embedded therein a mass of birefringent, needle-shaped particles, the needle axes of the particles coinciding with a principal optical direction thereof and being oriented within the sheet to substantial parallelism. The particles and sheet of suspending plastic are preferably so selected that the suspending material has an index of refraction for one component of the beam emitted from the headlight coinciding substantially with the index of refraction of the particles for that component. It is this component which forms the specular non-diffused beam. The index of refraction of the suspending medium for the other component differs substantially from the index of refraction of the suspended particles therefor, and this component is accordingly diffused, or scattered, from the multiple interfaces between the suspended particles and the suspending medium. It is this component which forms the diffused component emitted by the headlight.

In my said copending application it is pointed out that the suspended particles might be ether uniaxial or biaxial, and that the index of refraction of the suspending medium might match either the upper or the lower index of the particles, and that the suspending medium itself might be either iotropic or birefringent. Suitable suspending medias and particles or crystals for use in the suspension are disclosed in the said application and in my copending applications, Serial No. 72,501, for improvements in Light-polarizing material, filed April 3, 1936 (Patent No. 2,123,901, dated July 19, 1938), and Serial No. 83,040, for Light-polarizing material, filed June 2, 1936 (Patent No. 2,123,902, dated July 19, 1938).

In the said Patent No. 2,123,902 it is pointed out that the direction of diffusion or spread of the diffused component may be controlled by selecting crystals of a predetermined form and shape for use in the formation of the light-polarizing sheet employed in the invention. If rod-shaped or needle-shaped crystals are employed, for example, the diffused component will be scattered or spread in a direction at right angles to the direction of orientation of the needle axes of the crystals. Thus if such a suspension is employed and is positioned before a headlight with the needle axes of the crystals substantially vertical, the diffusion will be substantially horizontal.

The present invention contemplates a modification of the structure shown and described in my said copending application Serial No. 83,039. It is desirable, in the illumination of the pathway of automotive vehicles, that the portion of the beam forming the hot spot 20 in Fig. 1 be projected down the road substantially parallel to the surface of the road, or in any event so nearly parallel to the surface of the road that it strikes the surface well in advance of the vehicle. On the other hand, it is desirable that the diffused component 22 strike the road, or more accurately the sides of the road, much closer to the vehicle, so that the road and the adjacent borders of the road are illuminated at the road level within a few yards of the front of the vehicle.

In the device shown in my said copending application, a portion of each ray of the beam emitted from the headlight is utilized to form the hot spot beam and the remainder of each ray is utilized to form the diffused beam; i. e., light passing through the entire headlight lens area enters into each of the two projected components. Under these circumstances difficulties arise in connection with the control of direction of propagation of one component as distinct from the other, for any lens employed in the headlight acts upon both components of the emitted beam.

I have found that if the sheet-like suspension 24 of oriented birefringent crystals is so positioned as to be inclined from the vertical and with its lower portion in advance of its upper portion, as shown for example in Fig. 2, the effect is to depress the outer ends or edges of the diffused component 22 so that that component is projected from the headlight 26 in the form of an arcuate band of light, as shown for example in Fig. 1. The central portion of the component coincides with the specular component, which is not substantially affected by the change in position of the polarizing element. Those portions of the diffused component on either side of the specular component are progressively depressed or lowered so as to more nearly approach the surface of the road. The shading in Fig. 1 will be understood as representing substantially the directions of vibration of the two components in a preferred form of the invention. These directions may be perpendicular, as shown.

The curvature of the arcuate band of illumination comprising the diffused component may be readily controlled by controlling the inclination from the vertical of the polarizing element adjacent the light source. The greater the inclination the greater the curvature of the band of illumination of the projected beam. It should be noted that the degree of inclination has no substantial effect upon the direction of propagation of the specular component.

Such a positioning of the light-polarizing element possesses marked advantages. Not only are the sides of the road adjacent the vehicle adequately illuminated at the road level, but the diffused component may be depressed on the side at which an approaching vehicle is met, so that this component is carried below the eye-level of the driver of the approaching vehicle. Such a result acts to further diminish the glare when two cars pass on a road.

If the direction of orientation of the crystalline particles within the suspension remains in vertical planes, the depression of each side of the diffused component as the polarizing element is inclined from the vertical in the manner shown in Fig. 2 will be constant. If, however, the element is rotated slightly, so that the direction of orientation of the suspended particles is no longer in vertical planes, but is rather in planes inclined from the vertical, then the depression of one side of the diffused beam projected from the headlight will be greater than that of the other side of the beam. If the element is rotated, for example, in a clockwise direction (looking in the direction of propagation of the beam), then the right-hand side of the diffused component will be more sharply depressed than the left-hand side, and vice versa. All such modifications of the position of the polarizing element adjacent the headlight are to be deemed within the scope of this invention.

Where plane-polarized light is employed in the elimination of headlight glare, it is desirable that the beam emitted from the headlight vibrate in a direction substantialy at 45° to the horizontal, as shown in Fig. 1. This may be accomplished in connection with devices of the present invention by employing with the polarizing suspension a sheet-like half-wave plate 28, for example a sheet of cellulosic material possessing half-wave properties, or any equivalent element. The sheet should be so positioned as to lie adjacent the polarizing element, or in any event so as to intercept the specular component transmitted thereby. It may preferably be laminated with the polarizing element to form a unitary structure, as shown for example in Fig. 3, and should be positioned with its optic axis at an angle of 22½° to the direction of vibration of the beam comprising the specular component, or with its optic axis at 22½° to the direction of vibration of the beam comprising the diffused component, if those vibration directions are either vertical or horizontal. In either case the vibration directions of the two components will be rotated until they vibrate substantially at 45° to the horizontal and substantially at right angles to each other.

It is to be understood that the half-wave plate may be employed with the polarizing element positioned as shown in my said copending application Serial No. 83,039, i. e., with the element positioned in a vertical plane and not inclined from the vertical, as heretofore described, or the half-wave plate may be employed in connection with the structure in which the polarizing element is inclined from the vertical, so as to depress the outer edges of the diffused component of the projected beam. If the polarizer and half-wave plate are inclined from the vertical, care should be taken to assure that the retardation element functions as a half-wave plate for light incident thereon at the angle of incidence of the headlight beam.

Where a half-wave device is used, a preferred embodiment of the invention contemplates the use of an analyzer, as the glare-blocking screen, comprising also a half-wave plate, and so positioned that corresponding axes of the two half-wave devices, i. e., that adjacent the polarizing screen and that adjacent the viewing screen, are substantially at right angles to each other.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. Means for avoiding glare from automobile headlights and the like comprising a suspension of oriented rod-shaped birefringent crystals in a light-transmitting medium, the index of refraction of the crystals matching the index of refraction of the medium substantially for light vibrating in a predetermined direction, the index of refraction of the crystals differing substantially from the index of refraction of the medium for light vibrating at right angles to said direction, means for positioning said suspension in the path of rays emanating from a headlight and in a plane inclined from the vertical so that the lower portion of said suspension is advanced in the direction of propagation of the headlight beam beyond the upper portion of the suspension, the crystals within the suspension being oriented with their long axes parallel and in the plane of inclination of said suspension, the horizontal traces of said crystals being substantially parallel to the direction of propagation of the beam emitted from said headlight.

2. Means for avoiding glare from automobile headlights and the like comprising a suspension of oriented rod-shaped birefringent crystals in a light-transmitting medium, the index of refraction of the crystals matching the index of refraction of the medium substantially for light vibrating in a predetermined direction, the index of refraction of the crystals differing substantially from the index of refraction of the medium for light vibrating at right angles to said direction, means for positioning said suspension in the path of rays emanating from a headlight and in a plane inclined from the vertical so that the lower portion of said suspension is advanced in the direction of propagation of the headlight beam beyond the upper portion of the suspension, the crystals within the suspension being oriented with their long axes substantially parallel and in the plane of inclination of said suspension, whereby the component of the incident light which is diffused by transmission through said suspension is so propagated as to impinge upon each side of the roadway in advance of the headlight, and a half-wave retardation element positioned to intercept light traversing said suspension and adapted to cause the non-diffused component to vibrate in a direction at approximately 45° to the horizontal.

3. In combination, a light polarizer comprising a suspension of optically-oriented birefringent particles in a light-transmitting medium, the particles and the medium having an index of refraction substantially coinciding for light vibrating in a predetermined direction and having indices of refraction differing substantially for light vibrating in a direction at right angles thereto, a half-wave retardation plate positioned adjacent the light-emitting face of said polarizing element to intercept both components of light beams transmitted thereby and positioned with a principal optical direction of said plate at an angle of approximately 22½° to the direction of vibration of light vibrating in the direction for which the indices of refraction of said particles and said medium substantially coincide, an automobile headlight, and means to position said light-polarizing element and said half-wave plate in the path of beams emanating from said headlight with said suspension inclined to the vertical, the lower portion of said suspension being advanced beyond the upper portion thereof in the direction of propagation of beams emanating from said headlight, whereby the diffused component of light beams transmitted by said suspension is propagated downwardly.

4. In combination, a light polarizer comprising a suspension of optically-oriented birefringent particles in a light-transmitting medium, the particles and the medium having an index of refraction substantially coinciding for light vibrating in a predetermined directon and having indices of refracton differing substantially for light vibrating in a direction at right angles thereto, a half-wave retardation plate positioned adjacent the light-emitting face of said polarizing element to intercept both components of light beams transmitted thereby and positioned with a principal optical direction of said retardation plate at an angle of approximately 22½° to the direction of vibration of one of said components, an automobile headlight, and means to position said light-polarizing element and said half-wave plate in the path of beams emanating from said headlight with the light polarizing element inclined to the vertical and with its lower portion advanced beyond its upper portion, whereby the outer portions of the diffused component transmitted by said element are depressed.

EDWIN H. LAND.